(12) United States Patent
Rocquelay et al.

(10) Patent No.: US 10,476,690 B2
(45) Date of Patent: Nov. 12, 2019

(54) METHOD AND DEVICE FOR TRANSMITTING A DATA STREAM IN A MULTICAST TRANSMISSION MODE

(71) Applicant: SAGEMCOM BROADBAND SAS, Rueil Malmaison (FR)

(72) Inventors: Antonie Rocquelay, Rueil Malmaison (FR); Laurent Alarcon, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 247 days.

(21) Appl. No.: 15/534,293

(22) PCT Filed: Dec. 8, 2015

(86) PCT No.: PCT/EP2015/078977
§ 371 (c)(1),
(2) Date: Jun. 8, 2017

(87) PCT Pub. No.: WO2016/091874
PCT Pub. Date: Jun. 16, 2016

(65) Prior Publication Data
US 2017/0346646 A1 Nov. 30, 2017

(51) Int. Cl.
*H04L 12/18* (2006.01)
*H04L 29/06* (2006.01)
*H04N 21/63* (2011.01)
*H04N 21/6405* (2011.01)
*H04L 29/12* (2006.01)

(52) U.S. Cl.
CPC ........ *H04L 12/185* (2013.01); *H04L 65/1069* (2013.01); *H04L 65/4076* (2013.01);
(Continued)

(58) Field of Classification Search
CPC . H04L 12/18; H04L 12/185; H04L 29/06027; H04L 49/201; H04L 65/4076;
(Continued)

(56) References Cited

U.S. PATENT DOCUMENTS

| 6,148,005 A | * | 11/2000 | Paul | ............... | H04N 7/17318 |
| | | | | | 348/E7.071 |
| 2011/0213827 A1 | * | 9/2011 | Kaspar | ............ | H04W 76/15 |
| | | | | | 709/203 |

(Continued)

FOREIGN PATENT DOCUMENTS

EP    2 611 067 A1    7/2013

OTHER PUBLICATIONS

Jan. 25, 2016 Search Report issued in International Patent Application No. PCT/EP2015/078977.
(Continued)

*Primary Examiner* — Christopher Biagini
(74) *Attorney, Agent, or Firm* — Oliff PLC; R. Brian Drozd

(57) ABSTRACT

In a communication network, a client has a plurality of network interfaces connecting it to a server able to deliver data streams on multicast groups. The client obtains a first request for subscription to a multicast group allowing to obtain a data stream. The client replaces the first subscription request with a plurality of second requests for subscription to a plurality of multicast subgroups able to supply data sub-streams which, once combined, allow to reconstruct the data stream. Each second subscription request is transmitted over a network interface with which the request was associated, so as to favour use of each available network interface. The client receives, over each network interface, a data sub-stream corresponding to the second subscription request transmitted over said network interface and reconstructs the data stream from the data sub-streams.

18 Claims, 7 Drawing Sheets

(52) U.S. Cl.
CPC ......... *H04L 65/608* (2013.01); *H04N 21/631* (2013.01); *H04N 21/6405* (2013.01); *H04L 61/2069* (2013.01)

(58) Field of Classification Search
CPC .............. H04L 65/4084; H04L 65/601; H04N 21/2402; H04N 21/6125; H04N 21/6405; H04N 21/8456; H04N 7/17318
See application file for complete search history.

(56) References Cited

U.S. PATENT DOCUMENTS

2012/0243441 A1* 9/2012 Reunamaki ............. H04L 67/14
370/255
2013/0219423 A1 8/2013 Prickett et al.
2014/0355605 A1* 12/2014 Gouache ............... H04L 12/185
370/390

OTHER PUBLICATIONS

Lindeberg et al; "Challenges and techniques for video streaming over mobile ad hoc networks;" Multimedia Systems; vol. 17; No. 1; May 13, 2010; pp. c 51-82; XP019878924.

Militano et al; "Multicast Service Delivery Solutions in LTE-Advanced Systems;" 2013 IEEE International Conference on Communications; Jun. 9, 2013; pp. 5954-5958; XP032522534.

Haberman et al; "Multicast Router Discovery; rfc4286.txt;" Dec. 1, 2005; XP015043213.

Cain et al; "Internet Group Management Protocol, Version 3; rfc337.txt;" Oct. 1, 2002; XP015009135.

* cited by examiner

METHOD AND DEVICE FOR TRANSMITTING A DATA STREAM IN A MULTICAST TRANSMISSION MODE

The present invention relates to a method for transmitting a data stream in a multicast transmission mode between a server device and a client device, and a client device and a server device implementing said method. The method benefits from the existence of a plurality of network interfaces connecting the client device to the server device.

Data transmission applications using multicast communication modes are known. Multicast communication modes are used mainly when a server device must transmit the same data stream to a plurality of client devices. The multicast communication mode is in particular used for applications for broadcasting multimedia programmes on a network such as for example applications for broadcasting television programmes on the internet, videos on demand or radio programmes on the internet.

One advantage of the multicast transmission mode is that it avoids duplicating data on certain portions of a communication network.

FIG. 1A illustrates schematically a first example of use of a multicast communication mode between a server device (or server) 101 and client devices (or clients) 103, 104 and 105. In the example in FIG. 1A, a communication link 106 connects the server 101 to a router 102. Communication links 107, 108 and 109 connect respectively the router 102 to the clients 103, 104 and 105. The communication links 107 (and respectively 108 and 109) and 106 form a communication path 106/107 (and respectively 106/108 and 106/109) between the server 101 and the client 103 (and respectively the client 104 and the client 105). By using the path 106/107 (and respectively the path 106/108 and the path 106/109), the client 103 (and respectively the client 104 and the client 105) therefore has a network interface connecting it to the server device 101.

Each client 103, 104 and 105 may be an end client such as a multimedia device able to use a data stream transmitted by the server 101. A multimedia device may for example be a computer, a touch tablet, a smartphone, a television set, or a digital television programme decoder. Each client 103, 104 and 105 may also be an intermediate client between an end client and the server 101. An intermediate client may for example be an internet gateway that retransmits the multimedia streams in a local network (local area network—LAN) to end client devices.

The multicast communication mode requires a client wishing to receive a data stream transmitted on a multicast group to subscribe to the multicast group. Managing subscriptions to a multicast group requires an exchange of a multicast group management request between each server, router and client involved in a multicast group. This management of subscriptions is conventionally implemented by the IGMP (internet group management protocol) described successively in RFC 988 (version 0), 1112 (version 1), 2236 (version 2) and 3376 (version 3)).

In the example in FIG. 1A, only the client 103 is a subscriber to a multicast group, referred to as the target multicast group. To do this the client 103 has sent an IGMP subscription request to the router 102 in order to inform the router 102 that the client 103 wishes to subscribe to the target multicast group. If no other client connected to the router 102 has subscribed to said target multicast group, the router 102 transmits an IGMP subscription request to the server 101 in order to advise it that a client wishes to receive the data stream corresponding to said target multicast group.

In this way, a transmission of the data stream corresponding to said target multicast group is activated. As long as the subscription is not effective, no data packet corresponding to the data stream passes between the server 101 and the client 103. As soon as the subscription is effective, data packets P1, P2, P3, P4 pass over the path 106/107.

FIG. 1B illustrates schematically a second example of use of a multicast communication mode between the server device 101 and the client devices 103, 104 and 105. In this example, the clients 104 and 105 subscribe to the same multicast group as the client 103. To do this, they each transmit an IGMP subscription request to the router 102 in order to indicate to it that they wish to subscribe to said target multicast group. Since in this case the client 103 was already a subscriber to the target multicast group, the router 102 does not have to transmit IGMP subscription requests to the server 101 following the reception of the IGMP subscription request coming from the clients 104 and 105. The example in FIG. 1B illustrates an advantage of the multicast communication mode. Although three clients are subscribers, the packets P7 and P8 are not duplicated on the link 106, the link 106 being a common link between the communication paths 106/107, 106/108 and 106/109. It is only after the router 102, on the links 107, 108 and 109, not common between the communication paths 106/107, 106/108 and 106/109, that the packets are duplicated, the packets having been duplicated by the router 102. In this way, the part of each communication path common to all the paths is not overloaded by multiple copies of each packet.

Hereinafter, when we speak of subscription requests and unsubscribe requests, these requests correspond to IGMP subscription requests and IGMP unsubscribe requests as defined by the IGMP protocol.

FIG. 1C illustrates schematically a limitation of a multicast communication mode when a client device has a plurality of network interfaces connecting the client device to a server device. In this example, each client 103, 104 and 105 has two network interfaces connecting it to the server 101. The client 103 (and respectively 104 and 105) has a first interface connecting it to the server 101 through the path 106/107 (and respectively 106/108 and 106/109) and a second network interface connecting it to the server 101 through a path 110/112 (and respectively 110/113 and 110/114) comprising links 110 and 112 (and respectively links 110 and 113 and links 110 and 114) and passing through a router 111. The multicast communication mode as currently defined does not enable a client to benefit from the presence of a plurality of communication interfaces. This is because a multicast communication can use only one communication path for transmitting a data stream. For example, in the case of subscription to a multicast group, the client can receive the data stream corresponding to the multicast group only on the path 106/107 or on the path 110/112. Since each communication path is associated with a bandwidth, a combined use of the two paths 106/107 and 110/112 would have allowed to increase a reception bandwidth of the client 103.

It is desirable to overcome these various drawbacks of the prior art.

It is in particular desirable to enable a client subscribing to a multicast group in order to obtain a data stream from a server to benefit from all the network interfaces connecting it to the server available to it.

It is in particular desirable to provide a solution that is simple to implement and at low cost.

According to a first aspect of the present invention, the present invention relates to a method for transmitting a data stream according to a multicast transmission mode between a server device and a client device, the method comprising the following steps implemented by the client device: obtaining a first request for subscription to a multicast group, referred to as the target multicast group, allowing to obtain a data stream; replacing the first request for subscription to the target multicast group with a plurality of second subscription requests, each second subscription request being associated with a multicast subgroup in a set of multicast subgroups, each multicast subgroup allowing to obtain a data sub-stream forming a subpart of the data stream, all the multicast subgroups allowing to obtain said data stream by combining the data sub-streams; associating a network interface with each second subscription request, each associated network interface being taken from a set of network interfaces connecting the server device to the client device and available on the client device; transmitting each second subscription request to the server device over the network interface that was associated with said second request; receiving data sub-streams corresponding to the second subscription requests transmitted, each data sub-stream received being received over the network interface over which the second subscription request associated with said data sub-stream was transmitted; reconstructing the data stream using the data sub-streams received in order to enable use of said data stream.

The invention therefore allows to benefit from all the network interfaces available on a client. The data of a data stream corresponding to a multicast group are distributed in a set of data sub-streams, each data sub-stream corresponding to a multicast subgroup. The client can then subscribe to the multicast subgroups from various network interfaces and receive the data sub-streams over said network interfaces. A reception of the data streams over a plurality of network interfaces allows to add together bandwidths available over the various network interfaces.

According to one embodiment, following the obtaining of the first request for subscription to the target multicast group, the client device seeks information representing said target multicast group in a set of information representing multicast groups, the first subscription request being replaced by the second subscription requests when the information representing said target multicast group is found in the set of information representing multicast groups.

According to one embodiment, when the information representing said target multicast group is sought in the set of information representing multicast groups, the client device implements the following steps: sending, to the server device, a request, referred to as a GETCAPS request, requesting information representing each data stream that can be delivered by said server device; receiving, from the server device, at least one request, referred to as a SENDCAPS request, supplying information representing each data stream that can be delivered by said server device; constructing the set of information representing multicast groups from the information representing data streams received; seeking the information representing said target multicast group in the set of information representing multicast groups thus constructed.

In this way, when a client device has no information on the data streams available on multicast groups, it can interrogate the server devices in order to obtain this information.

According to one embodiment, the information representing each data stream comprises information representing a multicast address of said data stream and information representing a set of data sub-streams corresponding to said data stream and, for each data sub-stream, information representing a multicast address of said data sub-stream.

According to one embodiment, the information representing each data stream further comprises information representing the transmission rate of each data stream and of each data sub-stream.

According to one embodiment, each GETCAPS request and each SENDCAPS request is compatible with an internet group management protocol (IGMP).

According to one embodiment, when the data sub-streams corresponding to the second subscription requests transmitted are received, the client device checks that, for each second subscription request transmitted, the data sub-stream corresponding to the multicast subgroup associated with said second subscription request is received, and reconstructs said data stream if each data sub-stream is received.

According to one embodiment, when at least one data sub-stream is not received, the client device transmits, to the server device, an unsubscribe request for each multicast subgroup for which a second subscription request has been transmitted.

According to one embodiment, when the information representing said multicast group is not found in the set of information representing multicast groups, the client device transmits the first subscription request to the server device so as to receive the data stream.

According to one embodiment, when, during the reception of the data sub-streams corresponding to the second subscription request transmitted, the client device detects an opening of a new network interface connecting the client device to the server device, the client device implements the following steps: enhancing said set of network interfaces by adding thereto the new network interface detected; associating the new network interface with at least one second request for subscription to a multicast subgroup in the set of multicast subgroups corresponding to the target multicast group; transmitting, to the server device, each second subscription request associated with the new network interface by using the new network interface; when a data sub-stream, referred to as the duplicated sub-stream, corresponding to a multicast subgroup, associated with a second subscription request transmitted over the new network interface, is received simultaneously over a plurality of network interfaces comprising the new network interface, transmitting an unsubscribe request for each multicast subgroup corresponding to a duplicated sub-stream received over a network interface other than the new network interface.

According to one embodiment, when a data sub-stream corresponding to a multicast subgroup, associated with a second subscription request transmitted over the new network interface, is not received over the new network interface, the client device transmits, to the server device, an unsubscribe request for the multicast subgroup corresponding to the data sub-stream not received.

According to one embodiment, when, during the reception of the data sub-streams corresponding to the second subscription requests transmitted, the client device detects a suppression of a network interface connecting the client device to the server device, the client device implements the following steps: reducing said set of network interfaces by removing the suppressed network interface; associating each second subscription request previously associated with the suppressed network interface with a network interface in the reduced set of network interfaces; transmitting, to the server device, each second subscription request previously associated with the suppressed network interface using the network interface in the set of reduced network interfaces with which it is associated; reconstructing the multicast stream if, following the transmission of each second subscription request previously associated with the suppressed network interface, each data sub-stream corresponding to each second subscription request transmitted is received.

According to one embodiment, if, following the transmission of each second subscription request previously associated with the suppressed network interface, at least one data sub-stream corresponding to a second subscription request transmitted is not received, the client device transmits, to the server device, an unsubscribe request for each multicast subgroup.

According to one embodiment, the method comprises the following steps implemented by the server device: receiving each second subscription request over a reception interface; distributing the data of the data stream in the data sub-stream; transmitting each data sub-stream over a network interface corresponding to the interface receiving the second subscription request associated with the multicast subgroup corresponding to said data sub-stream.

According to one embodiment, in distributing the data of the data stream in the data sub-streams, account is taken of the information representing the transmission rate of each data stream and/or of each sub-stream.

According to a second aspect of the present invention, the present invention relates to a client device able to receive a data stream according to a multicast transmission mode from a server device, comprising the following means: means for obtaining a first request for subscription to a multicast group, referred to as the target multicast group, allowing to obtain a data stream; means for replacing the first request for subscription to the target multicast group with a plurality of second subscription requests, each second subscription request being associated with a multicast subgroup in a set of multicast subgroups, each multicast subgroup allowing to obtain a data sub-stream forming a subpart of the data stream, all the multicast subgroups allowing to obtain said data stream by combining the data sub-streams; means for associating a network interface with each second subscription request, each associated network interface being taken from a set of network interfaces connecting the server device to the client device and available on the client device; means for transmitting each second subscription request to the server device on the network interface that was associated with said second request; means for receiving data sub-streams corresponding to the second subscriptions transmitted, each data sub-stream received being received over the network interface over which the second subscription request associated with said data sub-stream was transmitted; means for reconstructing the data stream using the data sub-streams received in order to enable use of said data stream.

According to a third aspect of the present invention, the present invention relates to a server device able to transmit a data stream in a multicast transmission mode to a client device, comprising the following means: reception means for receiving a plurality of second subscription requests corresponding to a plurality of second subscription requests transmitted by the client device in replacement for a first request for subscription to a target multicast group obtained by the client device, the target multicast group allowing to obtain a data stream, each second subscription request being associated with a multicast subgroup in a set of multicast subgroups, each multicast group allowing to obtain a data sub-stream forming a subpart of the data stream, all the multicast subgroups allowing to obtain said data stream by combining the data sub-streams; distribution means for distributing the data of the data stream in the data sub-streams; transmission means for transmitting each data sub-stream over a network interface corresponding to an interface for receiving the second subscription requests associated with the multicast subgroup corresponding to said data sub-stream.

According to a fourth aspect of the present invention, the invention relates to a communication system comprising a server device according to the third aspect and at least one client device according to the second aspect.

According to a fifth aspect of the present invention, the present invention relates to a computer program containing instructions for the implementation, by a client device or a server device, of the method according to the first aspect when said program is executed by a processor of said server device or of said client device.

According to a sixth aspect of the present invention, the present invention relates to storage means storing a computer program containing instructions for the implementation, by a client device or a server device, of the method according to a first aspect, when said program is executed by a processor of said server device or of said client device.

The features of the invention mentioned above, as well as others, will emerge more clearly from a reading of the following description of an example embodiment, said description being given in relation to the accompanying drawings, among which:

Figure 10:
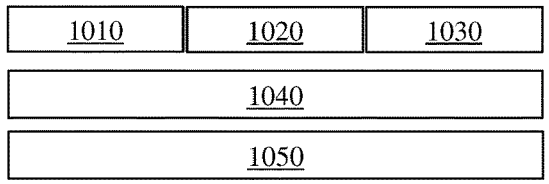
Figure 11:
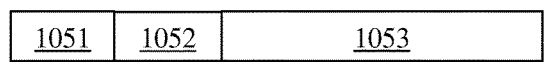
Figure 12:
Figure 13:
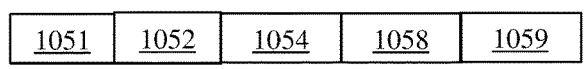

FIG. 10 illustrates schematically an example of a request enabling a server device to provide information representing each data stream that can be delivered by said server device in a corresponding multicast group; and FIGS. 11, 12 and 13 illustrate schematically examples of options of the request enabling a server device to provide information representing each data stream that can be delivered by said server device in a corresponding multicast group.

Figure 1A:
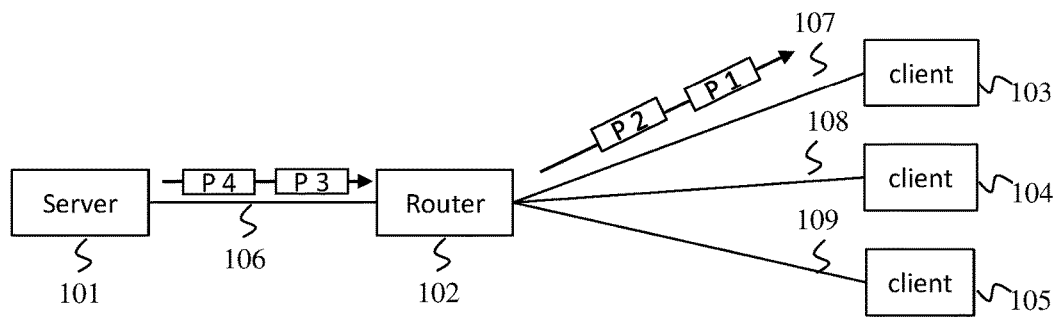
FIG. 1A illustrates schematically a first example of implementation of a multicast communication mode between a server device and a client device.
Figure 1B:
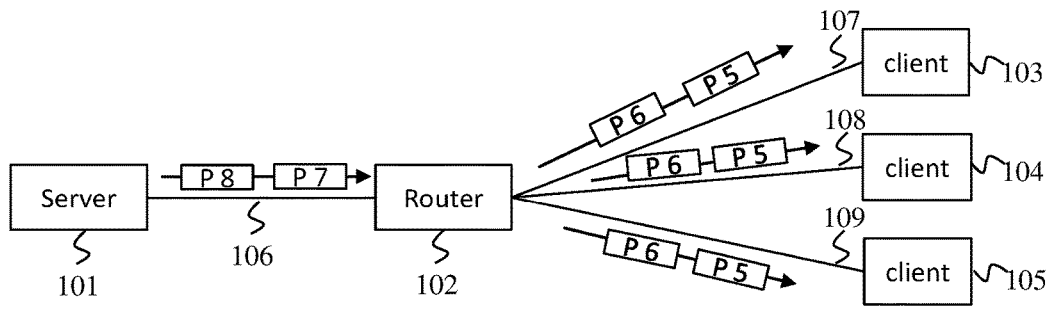
FIG. 1B illustrates schematically a second example of implementation of a multicast communication mode between a server device and client devices.
Figure 1C:
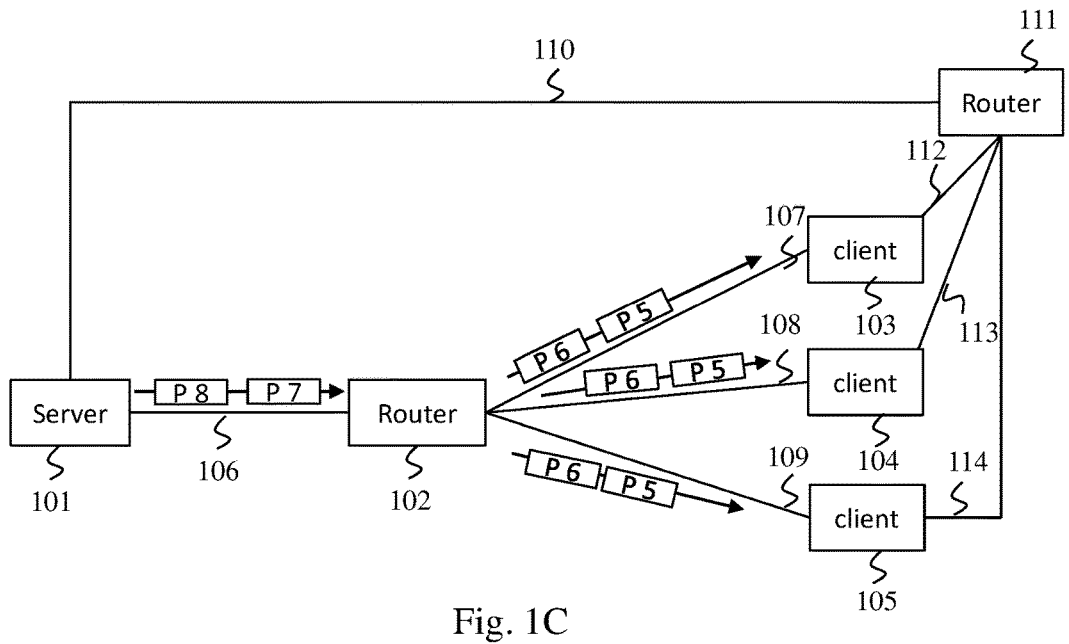
FIG. 1C illustrates schematically a limitation of a multicast communication mode when a client device has a plurality of network interfaces connecting the client device to a server device.
Figure 1D:
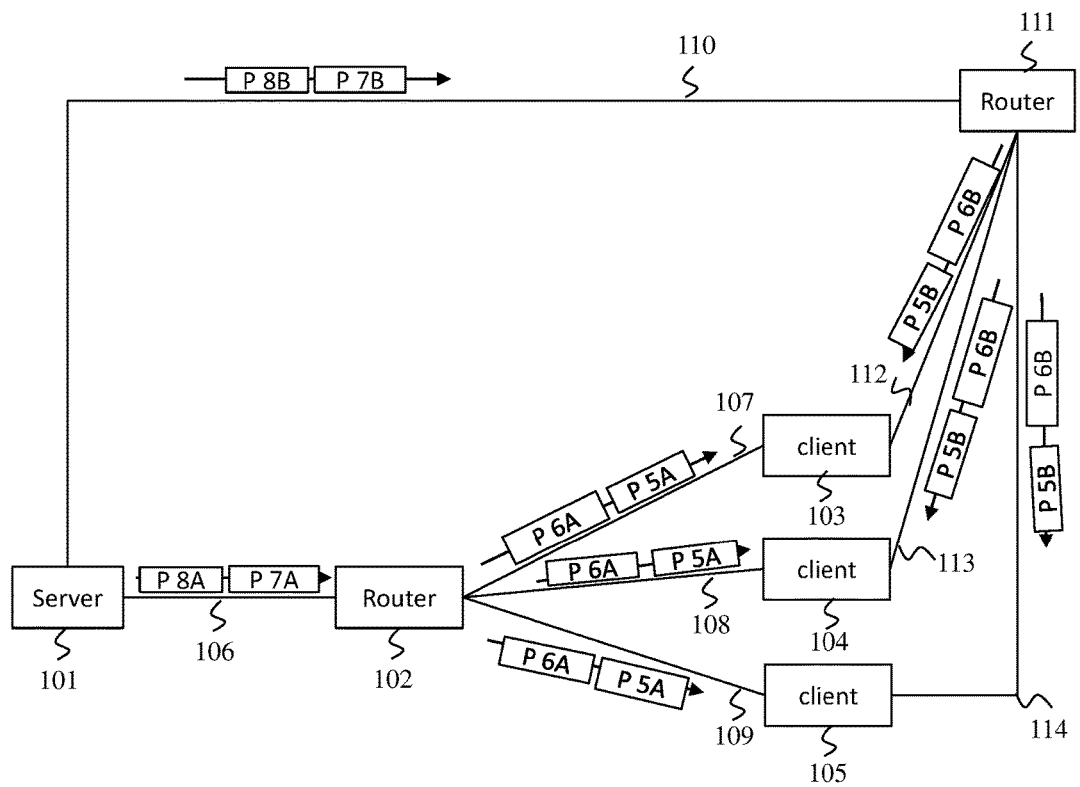
FIG. 1D illustrates schematically an implementation of the invention when a client device has a plurality of network interfaces connecting the client device to a server device.

FIG. 1D illustrates schematically an implementation of the invention when the client devices 103, 104 and 105 have a plurality of network interfaces connecting each client device 103, 104 and 105 to the server device 101. This example repeats the situation in FIG. 1C in which each client 103, 104 and 105 has two network interfaces connecting to the server 101. We assume here that each client 103, 104 and 105 is an internet gateway, each internet gateway having received, from an end client situated in its local network, a first request to subscribe to the same multicast group, referred to as the target multicast group, allowing to obtain a data stream. In the context of the invention, according to a method that we describe subsequently, each client 103, 104 and 105 replaces the first request for subscription to a target multicast group with two second subscription requests. Each second subscription request is associated with a multicast subgroup in a set of multicast subgroups. Each multicast subgroup makes it possible to obtain a data sub-stream forming a subpart of the data stream, all the multicast subgroups allowing to obtain said data stream by combining the data sub-streams. Each client 103, 104 and 105 next transmits a first second subscription request to a first network interface (for example on the communication paths 106/107, 106/108 and 106/109) and a second subscription request on a second network interface (for example on the communication paths 110/112, 110/113, 110/114). When they receive the second subscription request, if no client connected to the routers 102 and 111 was not already a subscriber to one of the subgroups, the routers 102 and 111 each transmit to the server 101 a second subscription request corresponding to the second subscription requests that they have received. Following the reception of these second subscription requests, the server 101 begins a transmission of a first data sub-stream to the first network interface of the clients 103, 104 and 105 and of a second data sub-stream to the second network interface of the clients 103, 104 and 105. Each client 103, 104 and 105 next reconstructs the data stream from the data sub-streams that it receives and retransmits the reconstructed data stream to its respective end client situated in its local network. Each client 103, 104 and 105 therefore benefits from the use of each of the network interfaces available to it. For example, the client 103 benefits from a total of the bandwidths of the paths 106/107 and 110/112 for receiving the data stream.

Hereinafter the invention is described in the context of a multicast transmission between a server and a client, where the client is an internet gateway receiving a request for subscription to a multicast group of an end client situated in the local network of the internet gateway. The invention can however be implemented in the same way in an end client, such as a computer, a smartphone, a touch tablet, etc. In the latter case, the end client does not transmit a first request for subscription to a multicast group to an intermediate client that replaces this first subscription request with a plurality of second subscription requests, but itself replaces the first subscription request in a plurality of second subscription requests.

Moreover we will consider here applications for transmission of television data streams in multicast mode. Other data streams can however be envisaged such as for example radio data streams.

Figure 2A:
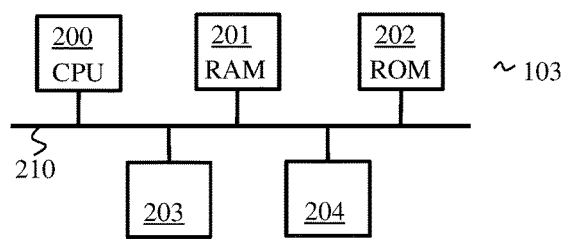
FIG. 2A illustrates schematically an example of hardware architecture of a client device implementing the invention.

FIG. 2A illustrates schematically an example of hardware architecture of a client device implementing the invention. We take here the example of the client 103. The client 103 then comprises, connected by a communication bus 210: a processor or CPU (central processing unit) 200; a random access memory (RAM) 201; a read only memory (ROM) 202; a storage unit or a storage medium reader, such as an SD (secure digital) card reader 203; a set 204 of connection interfaces for connecting the client 103 to one or more extended networks (WAN, wide area network) such as for example the internet, for communicating for example with the server 101, or to a local network for communicating for example with an end client.

The processor 200 is capable of executing instructions loaded into the RAM 201 from the ROM 202, from an external memory (not shown), from a storage medium such as an SD card, or from a communication network. When the client 103 is powered up, the processor 200 is capable of reading instructions from the RAM 201 and executing them. These instructions form a computer program causing the implementation, by the processor 200, of all or some of the methods described below in relation to FIGS. 3, 4, 5, 6 and 8.

Figure 2B:
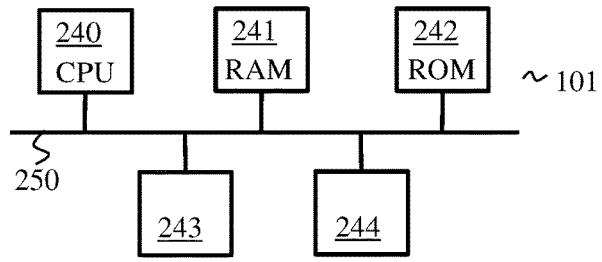
FIG. 2B illustrates schematically an example of hardware architecture of a server device implementing the invention.

FIG. 2B illustrates schematically an example of hardware architecture of a server device implementing the invention. We take here the example of the server 101. The server 101 then comprises, connected by a communication bus 250: a processor or CPU (central processing unit) 240; a random access memory (RAM) 241; a read only memory (ROM) 242; a storage unit or a storage medium reader, such as an SD (secure digital) card reader 243; a set 244 of connection interfaces for connecting the server 101 to one or more extended networks (WANs) in order to communicate for example with the clients 103, 104 and 105.

The processor 250 is capable of executing instructions loaded into the RAM 241 from the ROM 242, from an external memory (not shown), from a storage medium such as an SD card, or from a communication network. When the server 101 is powered up, the processor 240 is capable of reading instructions from the RAM 241 and executing them. These instructions form a computer program causing the implementation, by the processor 240, of all or some of the methods described below in relation FIG. 7.

All or part of the algorithm described below in relation to FIGS. 3, 4, 5, 6, 7 and 8 can be implemented in software form by the execution of a set of instructions from a programmable machine, such as a DSP (digital signal processor) or a microcontroller, or be implemented in hardware form by a machine or a dedicated component, such as an FPGA (field-programmable gate array) or an ASIC (application-specific integrated circuit).

Figure 3:
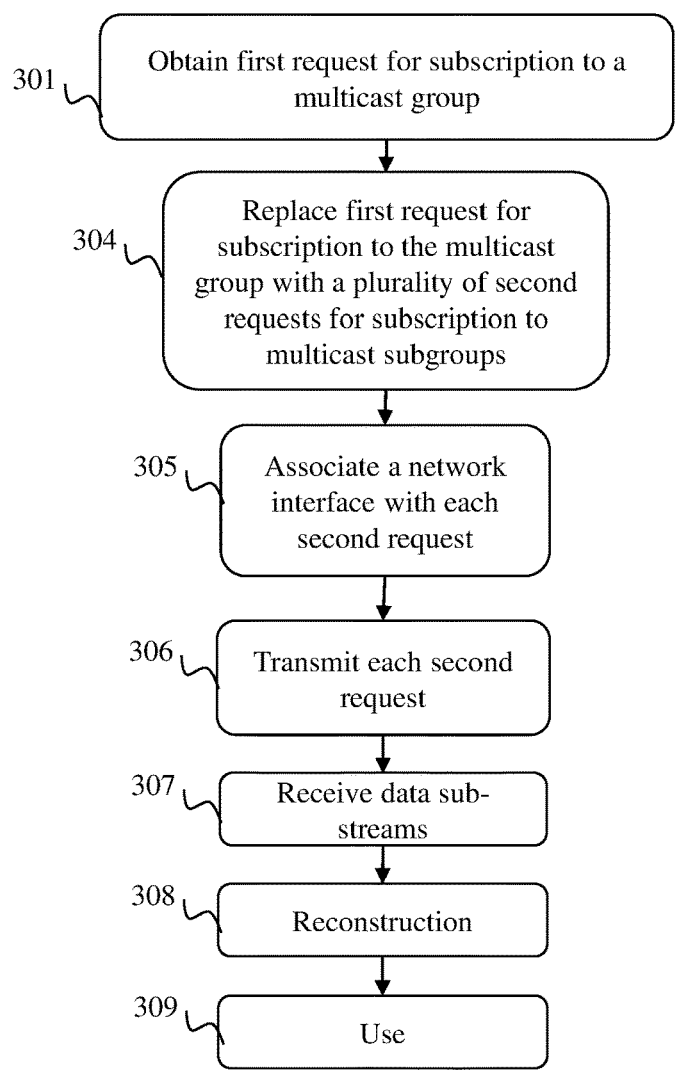
FIG. 3 illustrates schematically a first example of a method implemented by a client device, allowing to benefit from a plurality of network interfaces connecting the client device to a server device, in the context of a multicast communication.

FIG. 3 illustrates schematically a first example of a method implemented by a client device, allowing to benefit from a plurality of network interfaces connecting the client device to a server device, in the context of a multicast communication. We repeat here the example described in relation to FIG. 1D, the server being the server 101 and the client being the client 103.

In a step 301, the client 103 obtains a first request for subscription to a multicast group, referred to as the target multicast group, allowing to obtain a data stream. This subscription request has for example been transmitted to the client 103 by an end client connected to the local network of the client 103. In the example in FIG. 3, the objective of the request for subscription to the multicast group is to subscribe the end client to a multicast group allowing to receive a television data stream corresponding to a television channel.

In a step 304, the client 103 replaces the first request for subscription to the target multicast group with a plurality of second subscription requests. Each second subscription request is associated with a multicast subgroup in a set of multicast subgroups. Each multicast subgroup allows to obtain a data sub-stream forming a subpart of the data stream, all the multicast subgroups allowing to obtain said data stream by combining the data sub-streams. In the example in FIG. 3, it is assumed that the client 103 has a description of all the multicast groups to which an end client included in its local network could subscribe. This description matches each address of a multicast group with a plurality of addresses of multicast subgroups. Each plurality of addresses of multicast subgroups makes it possible to subscribe to multicast subgroups allowing to obtain data sub-streams which, by combining them, allow to reconstruct the data stream that would have been obtained by subscribing to the target multicast group.

In a step 305, the client 103 associates a network interface with each second subscription request. In one embodiment, the client 103 has a set of network interfaces comprising number of network interfaces sufficient for each second subscription request to be associated with a different network interface.

In a step 306, the client 103 transmits each second subscription request to the server 101 over the network interface that was associated with said second request. By transmitting a second subscription request over a given network interface, it is ensured that the data sub-stream corresponding to this second subscription request will be received on this given network interface.

In a step 307, the client 103 receives data sub-streams corresponding to the second subscription requests transmitted, each data sub-stream received being received over the network interface over which the second subscription request associated with said data sub-stream was transmitted. In one embodiment, all the data sub-streams for which a second subscription request was transmitted are systematically received.

In a step 308, the client 103 reconstructs the data stream from the data sub-streams received. In one embodiment, during transmission thereof, each data sub-stream was encapsulated in data packets each comprising sequence number information and a time indicator, such as for example packets compatible with the RTP protocol (real time transport protocol, RFC 1889). The use of packets containing sequence number information and a time indicator makes it possible to resequence the data packets of each data sub-stream received in order to reconstruct the data stream.

During a step 309, the client 103 transmits the data stream to the end client, which uses it. In the case of an application for transmitting television data, the end client decodes the television data stream in order to display a television channel.

In one embodiment, the description of all the multicast groups to which an end client included in the local network of the client 103 could subscribe comprises, for each data stream, information representing the transmission rate of the data stream and, for each data sub-stream, information on the transmission rate of the data sub-stream. Moreover, the client 103 is capable of estimating a bandwidth available on each network interface that it has. In this embodiment, during step 304, before effecting the replacement of the first subscription request with the second subscription request, the client 103 compares the transmission rate of the data stream corresponding to the target multicast group with a sum of the bandwidths available on the network interfaces available on the client 103. The replacement is carried out only if the transmission rate of the data stream is less than or equal to the sum of the bandwidths. If the transmission rate of the data stream is greater than the sum of the bandwidths, the subscription to the multicast group use is abandoned and steps 305 to 309 are not implemented by the client 103.

If the transmission rate of the data stream is less than the sum of the bandwidths, during step 305, before associating a second subscription request with a network interface, the client 103 checks that a total sum of the transmission rates of the sub-streams corresponding to the second subscription request associated with said interface is less than the bandwidth available on said network interface. If at least one of the second subscription requests cannot be associated with one of the network interfaces available on the client 103, the client 103 abandons the subscription to the multicast subgroups and does not implement steps 306 to 309.

In one embodiment, the client 103 has a number of network interfaces less than a number of multicast subgroups included in the set of multicast subgroups corresponding to the target multicast group. In this case, some network interfaces are associated with a plurality of second subscription requests.

In one embodiment, some data sub-streams corresponding to second subscription requests transmitted by the client 103 are not received. In this case, the client 103 reconstructs the data stream from the data sub-streams that it receives. In one embodiment, the client 103 replaces data packets of the sub-streams that it has not received with data packets of the streams that it received closest in time to the lost packets. In another embodiment, the client 103 does not attempt to replace the data packets of the streams that it has not received and considers that each loss of data corresponding to these data packets can be masked by the end client using error concealment methods.

In one embodiment, when it is powered up, the client 103 does not have a description of all the multicast groups to which an end client included in its local network could subscribe. It is then necessary for it to obtain it from the server 101. The client 103 can then obtain this description, for example, by sending an HTTP (hypertext transfer protocol) request on a URL (uniform resource locator) address of the server 101. In response, the server 101 sends the description, for example in text, HTML (hypertext markup language) or XML (extensible markup language). We shall see hereinafter in relation to step 302 of FIG. 4 and FIGS. 3 to 13 a second method enabling the client 103 to recover the description based on an IGMP protocol.

Figure 4:
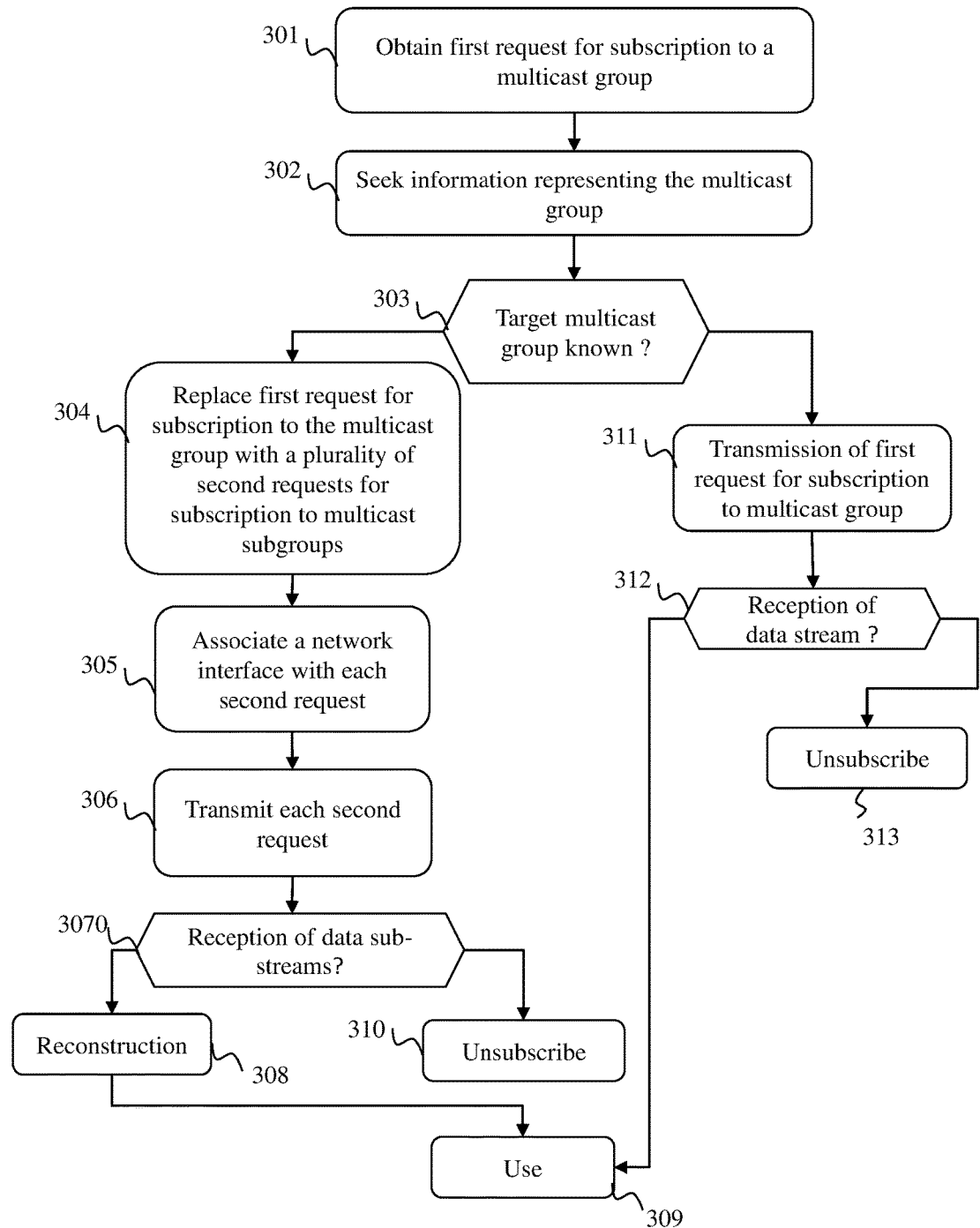
FIG. 4 illustrates schematically a second example of a method implemented by a client device, allowing to benefit from a plurality of network interfaces connecting the client device to a server device, in the context of a multicast communication.

FIG. 4 illustrates schematically a second example of a method used by the client device 103, allowing to benefit from a plurality of network interfaces connecting the client device 103 to the server device 101, in the context of a multicast communication. This method repeats steps 301, 304, 305, 306, 308 and 309 of the method described in relation to FIG. 3 and adds additional steps.

The method begins with the step 301 described in relation to FIG. 3.

In a step 302, the client 103 seeks information representing the target multicast group in a set of information representing multicast groups. Step 302 is detailed hereinafter in relation to FIGS. 8 to 13.

In a step 303, the client 103 checks whether the information representing said target multicast group is situated in the set of information representing multicast groups and that, in the information representing the target group, the address of the target multicast group is matched with a plurality of addresses of multicast subgroups.

If the information representing said multicast group is situated in the set of information representing multicast groups and the multicast address of the target group is matched with a plurality of addresses of multicast subgroups, the client 103 considers that the target multicast group is suitable for transmission using all the network interfaces available on the client 103. In this case, the client 103 implements steps 304 to 306 already explained in relation to FIG. 3.

In a step 3070, the client 103 checks that all the data sub-streams corresponding to the second subscription requests transmitted by the client 103 are received by the client 103. If such is the case, the client 103 implements steps 308 and 309 already explained.

If at least one data sub-stream corresponding to a second request transmitted by the client 103 is not received by the client 103, in a step 310 the client 103 transmits, to the server 101, an unsubscribe request for each multicast subgroup for which a second subscription request has been transmitted.

During step 303, if the information representing said target multicast group is situated in the set of information representing multicast groups but the multicast address of the target group is not matched with a plurality of addresses of multicast subgroups, the client 103 considers that the target multicast group is not suitable for a transmission using all the network interfaces available on the client. In this case, step 303 is followed by a step 311, during which the first request for subscription to the multicast group is transmitted to the server 101.

In a step 312, the client 103 checks that the data stream corresponding to the target multicast group is received.

If the data stream is received, the client 103 continues with step 309. If the data stream is not received, the client 103 unsubscribes from the target multicast group.

During step 303, if the information representing said multicast group is not situated in the set of information representing multicast groups, the client 103 abandons the attempt to subscribe to the target multicast group.

Figure 8:
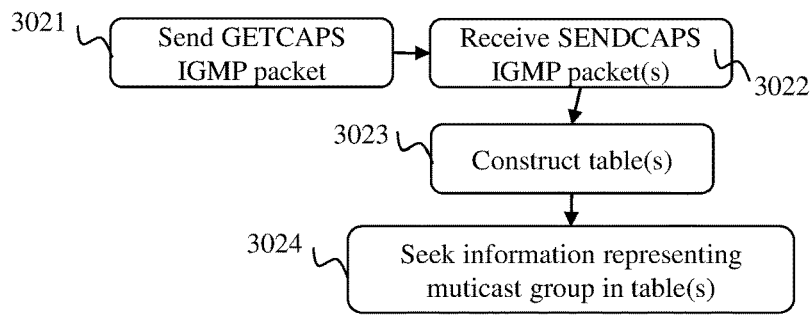
FIG. 8 illustrates schematically an example of a method implemented by a client device allowing to seek information representing a multicast group in a set of information representing multicast groups.

FIG. 8 illustrates schematically an example of a method implemented by the client device 103, allowing to seek information representing a multicast group in a set of information representing multicast groups. The method described in relation to FIG. 8 details an implementation of step 302. It is assumed here that the client 103, when it is powered up, does not have the description of all the multicast groups to which an end client included in the local network of the client 103 could subscribe and that consequently it is obliged to obtain this description from the server 101.

In a step 3021, the client 103 sends a request compatible with the IGMP protocol, referred to as a GETCAPS request, over all its available network interfaces. In the context of FIGS. 1C and 1D, the GETCAPS requests are intended to obtain a description from the server 101, which is the only server available. In another embodiment, if a plurality of servers are available, the GETCAPS requests are intended for each server, each server being able to respond to a GETCAPS request that it receives by transmitting a description of the multicast groups to which an end client included in the local network of the client 103 could subscribe.

Figure 9:
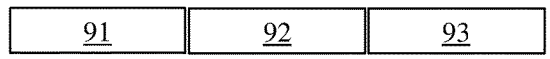
FIG. 9 illustrates schematically an example of a request allowing to obtain a description of the multicast groups that a server can provide.

FIG. 9 illustrates schematically an example of a GETCAPS request allowing to obtain a description of the multicast groups that a server can provide. A GETCAPS request comprises a "type" field 91, for example equal to 0x30 in hexadecimal, allowing to identify the GETCAPS request, a "Max Resp Code" field 92 allowing to indicate a maximum time allocated for obtaining a response from a server, and a "checksum" field 93 comprising an error correction code allowing to detect an error in the GETCAPS request. The "Max Resp Code" field provides a time indication expressed for example in tenths of a second. A server receiving a GETCAPS request must respond in a time equal to the value of the "Max Resp Code" field after reception of the GETCAPS request.

In a step 3022, the server 101 responds to the GETCAPS request that it has received. To do this, it sends an IGMP request, referred to as a SENDCAPS request, providing information representing each data stream that can be delivered by the server 101 when a client subscribes to a multicast group corresponding to this data stream.

FIG. 10 illustrates schematically an example of a SENDCAPS request enabling a server device to provide information representing each data stream that can be delivered by said server device in a corresponding multicast group.

A SENDCAPS request comprises a "type" field 1010, for example equal in hexadecimal to the value "0x31", allowing to identify the SENDCAPS request. A SENDCAPS request also comprises a reserved field "reserved" 1020, and a "checksum" field 1030 comprising an error correcting code allowing to detect an error in the SENDCAPS request. The "checksum" field is followed by a "TTL" (time to leave) field 1040 allowing to indicate to the clients a duration of validity of the information contained in the SENDCAPS request. The "TTL" field is followed by at least one optional field 1050.

Several types of optional field 1050 can be transported by a SENDCAPS request. In the application for broadcast of a television data stream, a first optional field 1050, described in relation to FIG. 11, allows to provide information on an operator delivering a television data stream. The optional field 1050 thus comprises an "option type" field 1051, for example equal to the value "1", indicating that the optional field 1050 gives information on an operator. Following the "option type" field 1051, the optional field 1050 comprises a "length" field 1052, indicating a length in bytes of a following "name" field 1053 indicating the name of the operator.

A second optional field 1050, described in relation to FIG. 12, allows to describe a television data stream. The optional field 1050 described in relation to FIG. 12 comprises an "option type" field 1051, for example equal to the value "5", indicating that the optional field 1050 gives information on a data stream. Following the "option type" field 1051, the optional field 1050 comprises a "length" field 1052, indicating a total length in bytes of following "channel code" 1054, "channel name" 1055, "stream transmission rate" 1056 and "group address" 1057 fields. The "channel code" field 1054 gives a code allocated to a television channel corresponding to a television data stream. The "channel name" field 1055 gives a name corresponding to the name of the television channel indicated by the "channel code" field. The "stream transmission rate" field 1056 indicates a transmission rate of the data stream. The "group address" field 1057 indicates a multicast address allowing to subscribe to the multicast group corresponding to the data stream.

A third optional field 1050, described in relation to FIG. 13, makes it possible to give information on data sub-streams corresponding to a data stream. The optional field described in relation to FIG. 13 thus allows to make a link between a multicast group and multicast subgroups corresponding to the multicast group. The optional field 1050 described in relation to FIG. 13 comprises an "option type" field 1051 for example equal to the value "6", indicating that the optional field 1051 gives information on data sub-streams corresponding to a data stream. Following the "option type" field 1051, the optional field 1050 comprises a "length" field 1052 indicating a total length in bytes of following fields, a "channel code" field 1055, a "subgroup address" field 1058, and a "sub-stream transmission rate" field 1059, the optional field described in relation to FIG. 13 containing a plurality of successive pairs of "subgroup address" 1058 and "sub-stream transmission rate" 1059 fields. The "subgroup address" 1058 and "sub-stream transmission rate" 1059 fields have a fixed size. The "subgroup address" field 1058 gives the address of a multicast subgroup corresponding to a data sub-stream. The "sub-stream transmission rate" field indicates a transmission rate of a data sub-stream. The presence of the "channel code" field 1055 allows to make a link between a data stream described in the optional field 1050 described in relation to FIG. 12 and data sub-streams described in the optional field 1050 described in relation to FIG. 13.

In some cases, the sending of a GETCAPS request over a network interface is not followed by a reception of a SENDCAPS request. This network interface may for example be connected to a third-party network of a third-party operator that is not an operator for which the client 103 has a subscription. Hereinafter an operator for which the client 103 has a description is termed the principal operator. In one embodiment, in order to be able to use the third-party network, a variant of the first optional field 1050 described in relation to FIG. 11 is used. This variant enables the server 101 to supply to the client 103 information on a network unit of the principal operator, accessible from a third-party network, and enabling the client 103 to communicate with the server 101. In this variant of the option 1050 described in relation to FIG. 11, the field "option type" 1051 takes a value indicating that the optional field 1050 supplies information allowing to communicate with the server 101 through a third-party network. For example, the "option type" field takes the value "2". The "length" field 1052 indicates a length in bytes of the following field "name" 1053. The field "name" 1053 indicates a fully qualified domain name (FQDN) allowing to specify an absolute address of the network unit of the principal operator accessible through the third-party network. Each request of the client 103 transmitted over the network interface connected to the third-party network is then transmitted to the network unit of the principal operator specified in the "name" field 1053, which will redirect them to the server 101.

In a step 3023, when it receives a SENDCAPS request, the client 103 constructs the set of information representing multicast groups. The set of information representing multicast groups forms a description of the multicast groups to which an end client of the local network of the client 103 can subscribe. This set may for example be put in the form of a table with as an input a multicast address of a multicast group, referred to as the input multicast group, and supplying, for each input multicast group, a description comprising addresses of multicast subgroups corresponding to the input multicast group and other information on the multicast group obtained when the SENDCAPS request is received.

In a step 3024, the client 103 seeks the target multicast group in the table that it has constructed. Step 1024 is followed by step 303, already described.

Frequently, during the transmission of a data stream according to a multicast transmission mode, some interfaces of a client become unusable, for example because of a break in a communication link, or become available, for example following the opening of a new communication link.

Figure 5:
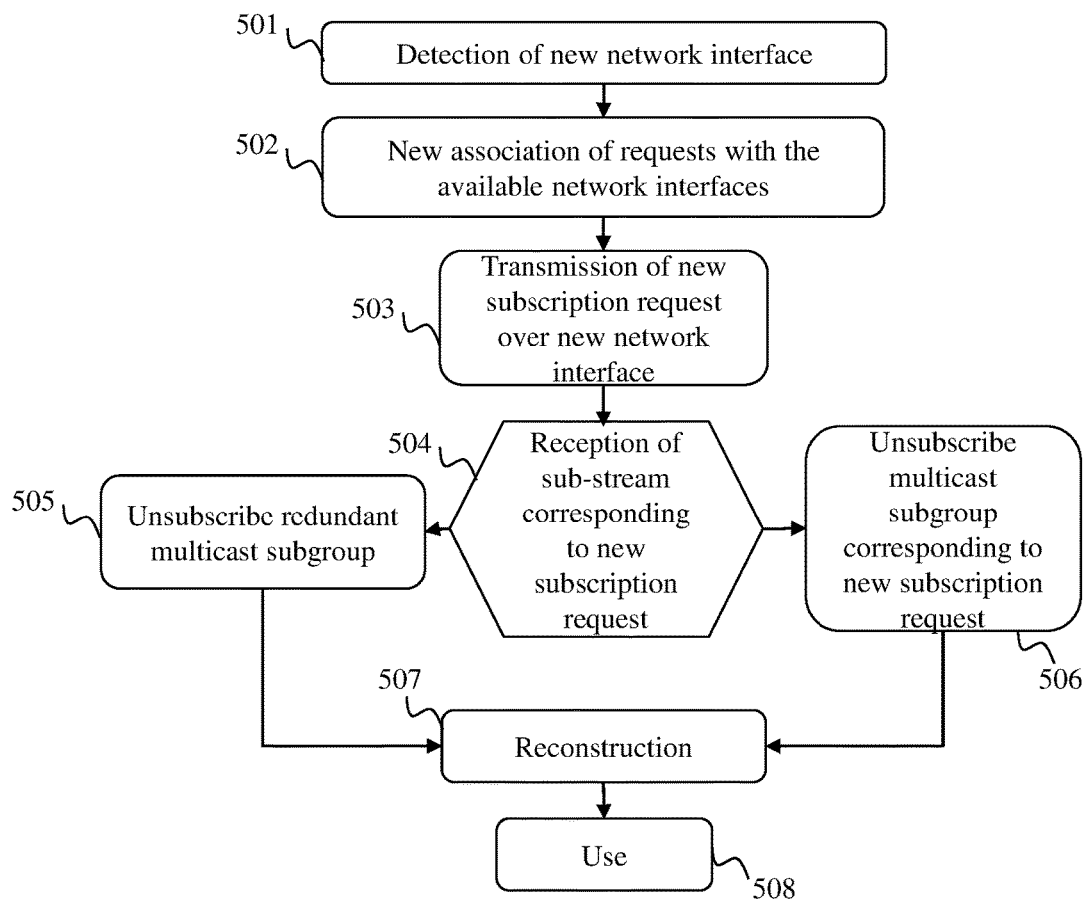
FIG. 5 illustrates schematically an example of a method implemented by a client device on the appearance of a new network interface connecting the client device to a server device.

FIG. 5 illustrates schematically an example of a method implemented by a client device when a new network interface connecting the client device 103 to the server device 101 appears.

In a step 501, the client device 103 detects the opening of a new network interface connecting the client device 103 to the server device 101.

In a step 502, the client device 103 enhances its set of available network interfaces by adding thereto the new network interface detected. During step 502, the client 103 associates the new network interface with at least one second request for subscription to a multicast subgroup, using the new network interface.

In a step 504, the client 103 checks that each data sub-stream corresponding to a second request transmitted over the new network interface is received.

If each data sub-stream is received, step 504 is followed by a step 505.

The second subscription requests transmitted over the new network interface correspond to data sub-streams already received over at least one other network interface different from the new network interface. This is because, during step 306, the client 103 had transmitted second subscription requests for all the data sub-streams allowing to reconstruct the data stream required by the end client. These second requests had then been transmitted over the network interfaces of the client 103 available when step 306 was implemented. To avoid receiving the same data sub-stream a plurality of times, during step 505, when the same data sub-stream, referred to as the duplicated sub-stream, is received over a plurality of network interfaces including the new network interface, the client 103 transmits an unsubscribe request for each multicast subgroup corresponding to the duplicated sub-stream received over a network interface other than the new network interface. To do this, the client 103 transmits an unsubscribe request for the multicast subgroups corresponding to the duplicated sub-stream over each other interface receiving the duplicated sub-stream.

Following step 505, the client 103 implements a step 507 and a step 508 respectively identical to steps 308 and 309.

In one embodiment, if, during step 504, a data sub-stream corresponding to a request transmitted over the new network interface is not received, step 504 is followed by a step 506. During step 506, the client transmits an unsubscribe request for the multicast subgroup corresponding to the data sub-stream not received over the new network interface in order to avoid this sub-stream being received later and consequently being duplicated.

Step 506 is followed by steps 507 and 508.

Figure 6:
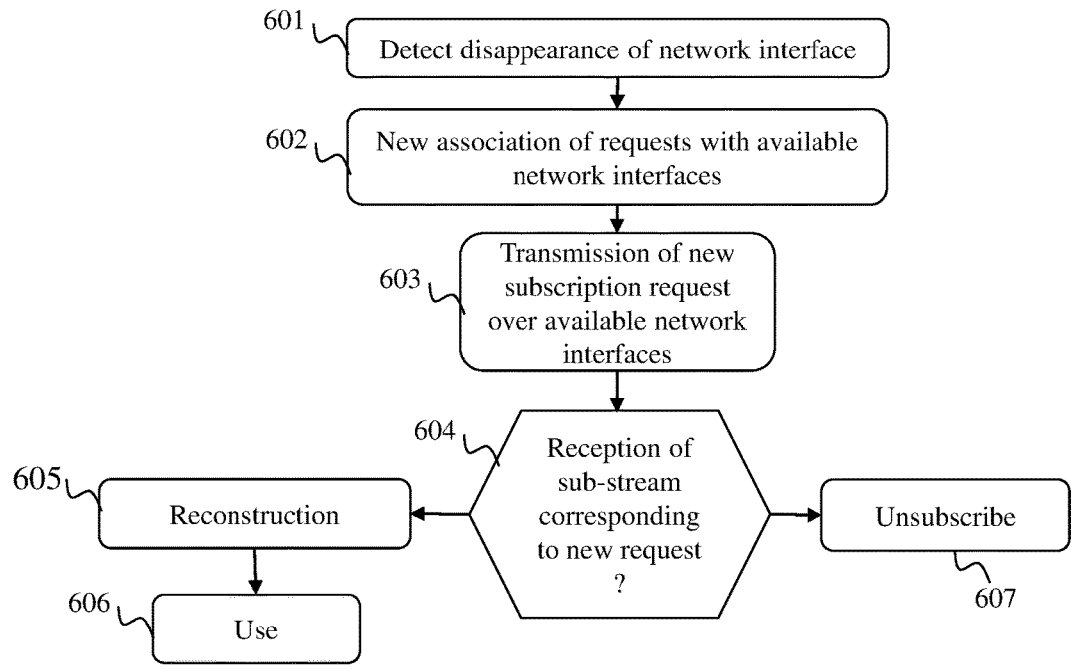
FIG. 6 illustrates schematically an example of the method implemented by a client device on the disappearance of an existing network interface connecting the client device to a server device.

FIG. 6 illustrates schematically an example of a method implemented by a client device when a network interface connecting the client 103 to the server 101 and available during step 306 disappears.

In a step 601, the client device detects a suppression of a network interface connecting the client 103 to the server 101.

In a step 602, the client device 103 reduces its set of available network interfaces by removing the suppressed network interface. During step 602, the client 103 associates each second subscription request previously associated with the suppressed network interface with a network interface in the reduced set of network interfaces.

In a step 603, the client 103 transmits, to the server device 101, each second subscription request previously associated with the suppressed network interface, using the network interface of the reduced set of network interfaces with which it is associated.

In a step 604, the client 103 checks that each sub-stream corresponding to a second request previously associated with the suppressed interface is properly received.

If each sub-stream is properly received, the client 103 implements step 605 and 606 respectively identical to steps 308 and 309.

If at least one sub-stream is not received, the client 103 implements a step 609 identical to step 310.

Figure 7:
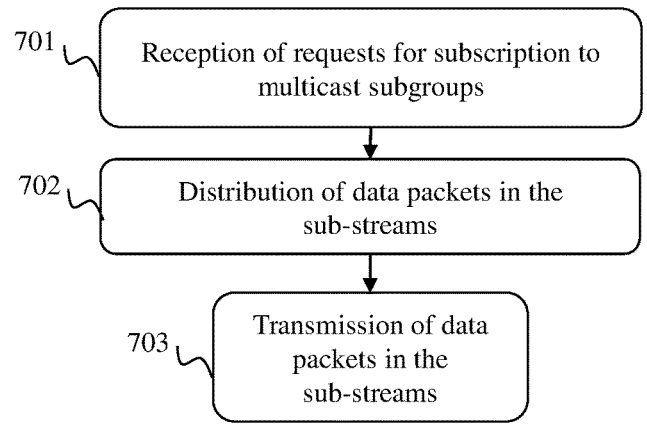
FIG. 7 illustrates schematically a method implemented by a server device allowing to transmit multicast sub-streams corresponding to a multicast stream to at least one client device.

FIG. 7 illustrates schematically a method implemented by the server 101, allowing to transmit multicast sub-streams, corresponding to a multicast stream, to at least one client device.

In a step 701, the server 101 receives each second subscription request over a network interface, referred to as the reception interface. The server then memorises over which reception interface it received each request and associates said reception interface with the multicast subgroup indicated in the request.

In a step 702, the server 101 distributes data packets of the data stream in the data sub-streams corresponding to the multicast groups for which it received a second subscription request. In one embodiment, the server 101, in distributing these packets, takes into account a target transmission rate for each data sub-stream. This target transmission rate corresponds to the transmission rate of each sub-stream indicated in the SENDCAPS requests.

In a step 703, the server 101 transmits each data sub-stream over the reception interface associated with the multicast sub-group corresponding to the sub-stream. In this way, the server 101 ensures that this data sub-stream is received over the network interface of the client 103 used to transmit the second subscription request corresponding to this sub-stream.

In the example in FIGS. 1C and 1D, the method described in relation to FIG. 7 is implemented when there is a first subscription of at least one of the clients 103, 104 or 105 to the multicast subgroups corresponding to the target multicast group. In the example in FIG. 7, this first subscription is implemented by the client 103. If, following this first subscription of the client 103, at least one of clients 104 and 105 initiates a procedure of subscription to the same multicast subgroups corresponding to the target multicast group, the server does not have an active role in these subscriptions. This is because these subscriptions are entirely managed by the routers 102 and 111, which are responsible for duplicating the data packets of the data sub-streams for the clients 104 and/or 105.

The invention claimed is:

1. A method for transmitting a data stream according to a multicast transmission mode between a server device and a client device, wherein the method comprises the following steps implemented by the client device:
   obtaining a first request for subscription to a multicast group, referred to as the target multicast group, allowing obtaining of a data stream;
   replacing the first request for subscription to the target multicast group with a plurality of second subscription requests, each second subscription request being associated with a multicast subgroup in a set of multicast subgroups, each multicast subgroup allowing obtaining of a data sub-stream forming a subpart of the data stream, all the multicast subgroups allowing obtaining of said data stream by combining the data sub-streams;
   associating a network interface with each second subscription request, each associated network interface being taken from a set of network interfaces connecting the server device to the client device and available on the client device;
   transmitting each second subscription request to the server device over the network interface that was associated with said second request;
   receiving data sub-streams corresponding to the second subscription requests transmitted, each data sub-stream received being received over the network interface on which the second subscription request associated with said data sub-stream was transmitted; and
   reconstructing the data stream using the data sub-streams received in order to enable use of said data stream
   wherein, following the obtaining of the first request for subscription to the target multicast group, the client device seeks information representing said target multicast group in a set of information representing multicast groups, the first subscription request being replaced by the second subscription requests when the information representing said target multicast group is found in the set of information representing multicast groups.

2. The method according to claim 1, wherein, when the information representing said target multicast group is sought in the set of information representing multicast groups, the client device implements the following steps:
   sending, to the server device, a request, referred to as a GETCAPS request, requesting information representing each data stream that can be delivered by said server device;
   receiving, from the server device, at least one request, referred to as a SENDCAPS request, supplying information representing each data stream that can be delivered by said server device;
   constructing the set of information representing multicast groups from the information representing data streams received; and
   seeking the information representing said target multicast group in the set of information representing multicast groups thus constructed.

3. The method according to claim 2, wherein the information representing each data stream comprises information representing a multicast address of said data stream and information representing a set of data sub-streams corresponding to said data stream and, for each data sub-stream, information representing a multicast address of said data sub-stream.

4. The method according to claim 3, wherein the information representing each data stream further comprises information representing the transmission rate of each data stream and of each data sub-stream.

5. The method according to claim 4, wherein the method comprises the following steps implemented by the server device:
   receiving each second subscription request over a reception interface;
   distributing the data of the data stream in the data sub-stream; and transmitting each data sub-stream over a network interface corresponding to the interface receiving the second subscription request associated with the multicast subgroup corresponding to said data sub-stream.

6. The method according to claim 5, wherein, in distributing the data of the data stream in the data sub-streams, account is taken of the information representing the transmission rate of each data stream and/or of each sub-stream.

7. The method according to claim 2, wherein each GET-CAPS request and each SENDCAPS request is compatible with an internet group management protocol (IGMP).

8. The method according to claim 1, wherein when the data sub-streams corresponding to the second subscription requests transmitted are received, the client device checks that, for each second subscription request transmitted, the data sub-stream corresponding to the multicast subgroup associated with said second subscription request is received, and reconstructs said data stream if each data sub-stream is received.

9. The method according to claim 8, wherein, when at least one data sub-stream is not received, the client device transmits, to the server device, an unsubscribe request for each multicast subgroup for which a second subscription request has been transmitted.

10. The method according to claim 1, wherein, when the information representing said multicast group is not found in the set of information representing multicast groups, the client device transmits the first subscription request to the server device so as to receive the data stream.

11. The method according to claim 1, wherein, when, during the reception of the data sub-streams corresponding to the second subscription request transmitted, the client device detects an opening of a new network interface connecting the client device to the server device, the client device implements the following steps:
    enhancing said set of network interfaces by adding thereto the new network interface detected;
    associating the new network interface with at least one second request for subscription to a multicast subgroup in the set of multicast subgroups corresponding to the target multicast group;
    transmitting, to the server device, each second subscription request associated with the new network interface by using the new network interface; and
    when a data sub-stream, referred to as the duplicated sub-stream, corresponding to a multicast subgroup, associated with a second subscription request transmitted over the new network interface, is received simultaneously over a plurality of network interfaces comprising the new network interface, transmitting an unsubscribe request for each multicast subgroup corresponding to a duplicated sub-stream received over a network interface other than the new network interface.

12. The method according to claim 11, wherein, when a data sub-stream corresponding to a multicast subgroup, associated with a second subscription request transmitted over the new network interface, is not received over the new network interface, the client device transmits, to the server device, an unsubscribe request for the multicast subgroup corresponding to the data sub-stream not received.

13. The method according to claim 1, wherein, when during the reception of the data sub-streams corresponding to the second subscription requests transmitted, the client device detects a suppression of a network interface connecting the client device to the server device, the client device implements the following steps:
    reducing said set of network interfaces by removing the suppressed network interface;
    associating each second subscription request previously associated with the suppressed network interface with a network interface in the reduced set of network interfaces;
    transmitting, to the server device, each second subscription request previously associated with the suppressed network interface using the network interface in the set of reduced network interfaces with which it is associated; and
    reconstructing the multicast stream if, following the transmission of each second subscription request previously associated with the suppressed network interface, each data sub-stream corresponding to each second subscription request transmitted is received.

14. The method according to claim 13, wherein, if, following the transmission of each second subscription request previously associated with the suppressed network interface, at least one data sub-stream corresponding to a second subscription request transmitted is not received, the client device transmits, to the server device, an unsubscribe request for each multicast subgroup.

15. A computer program product embodied in a non-transitory storage medium, the computer program product comprising instructions for the implementation, by a client device, of the method according to claim 1 when said program is executed by a processor of the client device.

16. A non-transitory storage medium having stored thereon a computer program comprising instructions for the implementation, by a client device, of the method according to claim 1 when said program is executed by a processor of said client device.

17. A client device able to receive a data stream according to a multicast transmission mode from a server device, comprising at least one processor configured to:
    obtain a first request for subscription to a multicast group, referred to as the target multicast group, allowing obtaining of a data stream;
    replace the first request for subscription to the target multicast group with a plurality of second subscription requests, each second subscription request being associated with a multicast subgroup in a set of multicast subgroups, each multicast subgroup allowing obtaining of a data sub-stream forming a subpart of the data stream, all the multicast subgroups allowing obtaining of said data stream by combining the data sub-streams;
    associate a network interface with each second subscription request, each associated network interface being taken from a set of network interfaces connecting the server device to the client device and available on the client device;
    transmit each second subscription request to the server device on the network interface that was associated with it;
    receive data sub-streams corresponding to the second subscriptions transmitted, each data sub-stream received being received over the network interface over which the second subscription request associated with said data sub-stream was transmitted; and
    reconstruct the data stream using the data sub-streams received in order to enable use of said data stream
    wherein, following the obtaining of the first request for subscription to the target multicast group, the client device seeks information representing said target multicast group in a set of information representing multicast groups, the first subscription request being replaced by the second subscription requests when the information representing said target multicast group is found in the set of information representing multicast groups.

18. A communication system, comprising:

a server device; and at least one client device able to receive a data stream according to a multicast transmission mode from the server device, comprising at least one processor configured to:

obtain a first request for subscription to a multicast group, referred to as the target multicast group, allowing obtaining of a data stream;

replace the first request for subscription to the target multicast group with a plurality of second subscription requests, each second subscription request being associated with a multicast subgroup in a set of multicast subgroups, each multicast subgroup allowing obtaining of a data sub-stream forming a subpart of the data stream, all the multicast subgroups allowing obtaining of said data stream by combining the data sub-streams;

associate a network interface with each second subscription request, each associated network interface being taken from a set of network interfaces connecting the server device to the client device and available on the client device;

transmit each second subscription request to the server device on the network interface that was associated with it;

receive data sub-streams corresponding to the second subscriptions transmitted, each data sub-stream received being received over the network interface over which the second subscription request associated with said data sub-stream was transmitted; and reconstruct the data stream using the data sub-streams received in order to enable use of said data stream wherein, following the obtaining of the first request for subscription to the target multicast group, the client device seeks information representing said target multicast group in a set of information representing multicast groups, the first subscription request being replaced by the second subscription requests when the information representing said target multicast group is found in the set of information representing multicast groups.

\* \* \* \* \*